(12) United States Patent
Inman

(10) Patent No.: US 6,907,800 B1
(45) Date of Patent: *Jun. 21, 2005

(54) SHAFTLESS GYROSTABILIZER FOR AERIAL PLATFORMS

(76) Inventor: William E. Inman, 4274 Old A1A South, Palm Coast, FL (US) 32137

( * ) Notice: Subject to any disclaimer, the term of this patent is extended or adjusted under 35 U.S.C. 154(b) by 37 days.

This patent is subject to a terminal disclaimer.

(21) Appl. No.: 10/446,009

(22) Filed: May 26, 2003

Related U.S. Application Data

(63) Continuation-in-part of application No. 09/680,495, filed on Oct. 5, 2000, now Pat. No. 6,568,291.

(51) Int. Cl.[7] .................. G01C 19/02; G01C 19/54; G01C 19/30
(52) U.S. Cl. ............... 74/5.4; 74/5.46; 114/121; 244/165
(58) Field of Search .............. 74/5.4, 5.9, 5.22, 74/5.46, 5.6 C, 86–87, 572–573; 114/121–124; 244/79, 165

(56) References Cited

U.S. PATENT DOCUMENTS

| | | | |
|---|---|---|---|
| 2,547,968 A * | 4/1951 | Paulus ................ 74/5.6 D |
| 2,871,707 A | 2/1959 | Kupier ................ 74/5.22 |
| 2,909,930 A * | 10/1959 | Erdley et al. .......... 74/5.4 |
| 3,158,340 A | 11/1964 | Sellers ................ 244/79 |
| 3,158,750 A * | 11/1964 | Roes ................... 307/84 |
| 3,193,216 A | 7/1965 | Fischel ................ 244/14 |
| 3,226,982 A | 1/1966 | Betts .................. 74/5.6 |
| 3,410,143 A | 11/1968 | Bowles ................ 74/5.6 |
| 3,424,401 A | 1/1969 | Maurer ................ 244/1 |
| 3,498,476 A | 3/1970 | Mattson et al. ........ 214/1 |
| 3,509,778 A | 5/1970 | Bowles ................ 74/5.6 |
| 3,540,289 A | 11/1970 | Ivers .................. 73/505 |
| 3,927,329 A * | 12/1975 | Fawcett et al. ........ 290/1 R |
| 4,150,579 A | 4/1979 | Vaughn ................ 74/5 R |
| 4,669,323 A | 6/1987 | Hojo et al. ............ 74/5.44 |
| 4,674,356 A | 6/1987 | Kilgore ............... 74/573 R |
| 4,905,776 A | 3/1990 | Beynet et al. ......... 175/56 |
| 4,951,514 A * | 8/1990 | Gubin ................. 74/5.37 |

(Continued)

FOREIGN PATENT DOCUMENTS

| | | | | |
|---|---|---|---|---|
| JP | 05141976 A * | 6/1993 | .......... G01C 19/02 |
| RU | 2115094 C1 * | 7/1998 | .......... G01C 25/00 |
| RU | 2213327 C2 * | 9/2003 | .......... G01C 21/18 |

*Primary Examiner*—Tisha Lewis
(74) *Attorney, Agent, or Firm*—Brian S. Steinberger; Law Offices of Brian S. Steinberger, P.A.

(57) ABSTRACT

Gyrostabilizer methods and apparatus having simultaneously counter-revolving masses that do not require physical shafts or axles. The stabilizer can have dual counter-revolving concentric rings, or tracks filled with weights such as spherical balls, that are propelled in orbital fashion by fluid pressure or electromagnet propulsion. The rings can include rigid contiguous rings, such as metal, plastic, composites, and the like. Additionally, the rings can include liquids and/or gasses. Still furthermore, the rings can include flexible, bendable contiguous materials, such as chains and ropes. The concentric ring diameters can be a few inches to more than ten (10) feet. Without an axle or shaft the weight of the gyrostabilizer is shifted to the perimeter where most of the momentum is generated at a fraction of the weight of gyrostabilizers that spin on an axle. The gyrostabilizer can dampen unsteadiness such as tremors, vibrations, sway, pitch, roll, and yaw.

20 Claims, 14 Drawing Sheets

U.S. PATENT DOCUMENTS

| | | | |
|---|---|---|---|
| 5,207,408 A | * | 5/1993 | Burg .......................... 248/550 |
| 5,224,426 A | * | 7/1993 | Rodnunsky et al. ........ 104/112 |
| 5,588,369 A | * | 12/1996 | Rizkalla et al. ................ 108/2 |
| 5,605,078 A | | 2/1997 | Taylor et al. ............. 74/573 R |
| 5,768,951 A | | 6/1998 | Hannah et al. ........... 74/573 R |
| 5,829,318 A | | 11/1998 | Hannah et al. ........... 74/573 F |
| 5,941,133 A | | 8/1999 | Wierzba et al. ........... 74/573 F |
| 6,568,291 B1 | * | 5/2003 | Inman ....................... 74/5.34 |

* cited by examiner

Fig. 15A
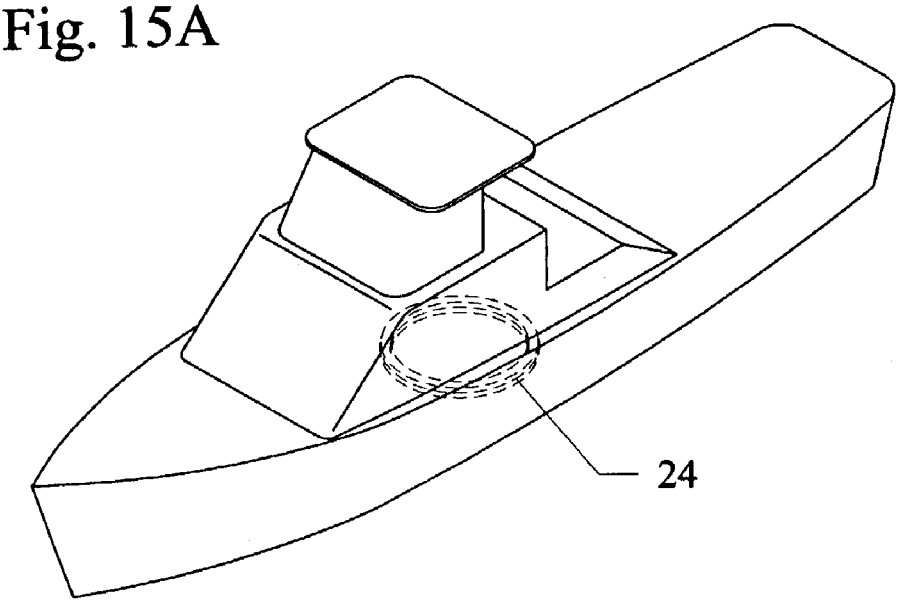
Fig. 15B
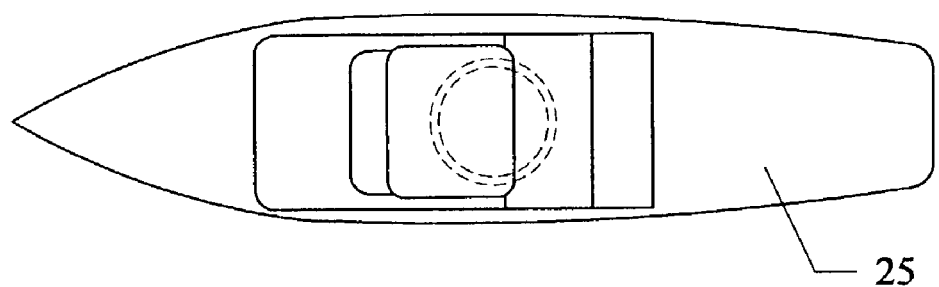
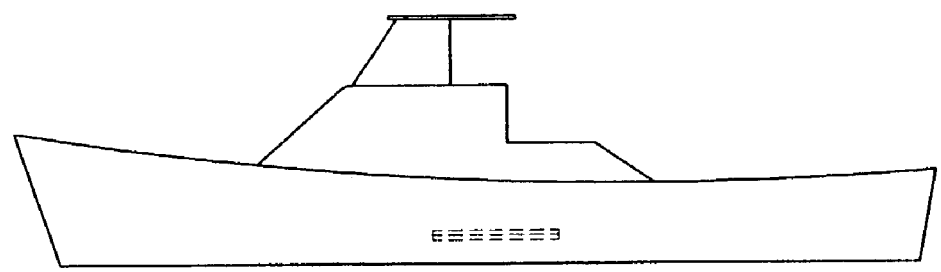
Fig. 15C

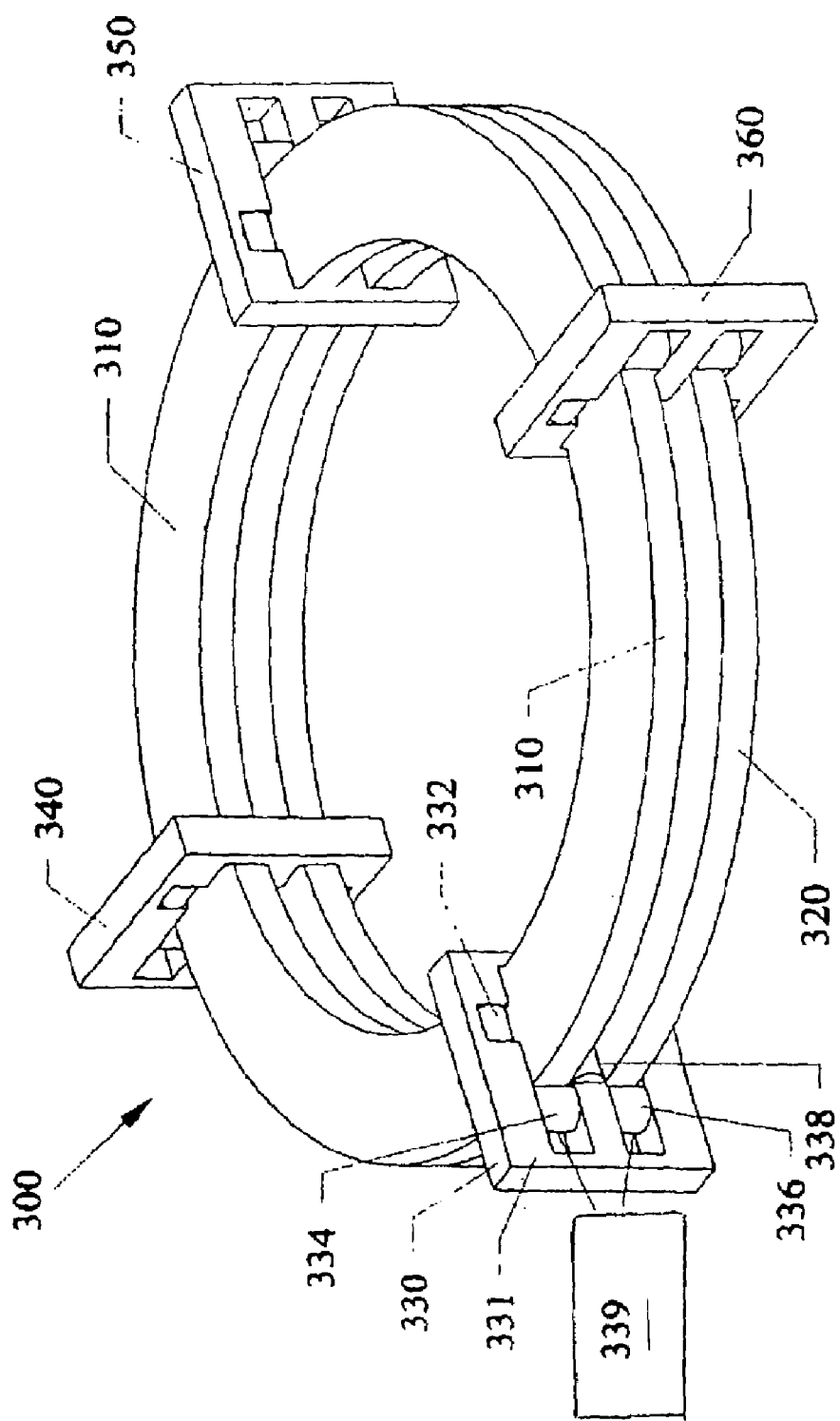

SHAFTLESS GYROSTABILIZER FOR AERIAL PLATFORMS

This invention is a Continuation-In-Part of U.S. patent application Ser. No. 09/680,495 filed Oct. 5, 2000, now allowed now U.S. Pat. No. 6,568,291.

FIELD OF INVENTION

This invention relates to shaftless gyrostabilizers, and in particular to methods and apparatus for stabilizing aerial platforms and vehicles while in motion or hover mode, where the gyrostabilizers control pitching, rolling, yawing and other unsteadiness in aerial platforms and vehicles that have limited or no other inherent controls for self-stabilization, and this invention also is used to dampen tremors, vibrations, swaying in buildings.

BACKGROUND AND PRIOR ART

Counter-rotating or oppositely spinning discs, or wheels, mounted on centrally located shafts or axles are known to be used as stabilizers for guided missiles in U.S. Pat. No. 3,193,216; for rotation control of a space vehicle in U.S. Pat. No. 3,424,401; and to suppress oscillation about an axis of a loaded crane in U.S. Pat. No. 3,498,476. In U.S. Pat. No. 3,540,289 a device having flat annular or circular rotors of magnetic material in a rigid frame is used to anchor a body subject to attitude change. Typical types of gyroscopes known to the subject inventor include for example U.S. Pat. No. 2,872,707 to Kuiper; U.S. Pat No. 3,158,340 to Sellers; U.S. Pat. No. 3,226,982 to Betts; U.S. Pat. No. 3,410,143 to Bowles; U.S. Pat. No. 3,509,778 to Bowles; and U.S. Pat. No. 4,150,579 to Vaughn. The devices identified above occupy valuable space and add considerable weight to the body that is being stabilized.

The disadvantages of the oppositely spinning discs arise from the requirement that they be physically mounted to a centrally located shaft or axle; thereby causing the entire disc to rotate and adding considerably more weight, volume, and surface area to the stabilizing device. Another disadvantage is that the centrally located axle or shaft restricts that space for other uses and finally the disc, axle or shaft arrangement limits the total revolutions per minute for discs due to wear and fatigue of the parts.

The disadvantages of the weight involved in spinning an entire disc have been addressed as follows. In U.S. Pat. No. 4,669,323, an attitude correction device is mounted above a gyro rotor and utilizes the flow of a viscous liquid and the rotation of one ball. U.S. Pat. No. 4,674,356 discloses a counter-balancing device having a discoid body with a circumferential ring of balls in a lubricating and damping fluid functioning to reduce vibrations and uneven bearing wear associated with unbalanced rotating members; the emphasis is on counter-balancing and not gyrostabilizing. According to U.S. Pat. No. 4,905,776 vibrational dampening for a drilling assembly is accomplished with races or tracks of tungsten-carbide balls in a fluid medium attached to the axial support rotating a drill bit. In a series of patents assigned to ETI Technologies, Inc. (U.S. Pat. Nos. 5,605, 078; 5,768,951; 5,829,318; and 5,941,133) balancer and vibration removing devices are disclosed which employ balls, cylindrical weights, disc-like weights and viscous fluids moving freely inside a housing with an annular groove, called a "race." All of the above spinning or rotating devices are arguably of less weight than a solid disc surface, but they all require mounting on a shaft or axle for rotation. Thus, the use restriction on the area in which the device is rotating remains a disadvantage. In addition, there are limits on the size of the stabilizing device based on space available within each application.

Attempts have been made over the years to rotate masses in closed type tracks. U.S. Pat. No. 2,871,707 to Kuiper patent describes a "gyroscopic stabilizer" that is limited rotor type devices in side-by-side arrangements that is used for binoculars, and has no description for use with stabilizing any type of vehicles such as aero platforms. This arrangement would also not be able to stabilize such vehicles for at least the reason of requiring extra side-by-side storage space for the side-by-side tracks.

U.S. Pat. No. 3,927,329 to Fawcett describes an energy converting system that clearly shows and requires rotatable wheels in FIGS. 8–9 being in a side-by-side configuration about shafts. Similar to the deficiencies to Kuiper, this reference has no description for being used as a gyrostabilizer.

Thus, the need exists for improved gyrostabilizers for use with vehicles such as aeroplatforms.

SUMMARY OF THE INVENTION

A first objective of the present invention is to provide a counter-revolving stabilizer for aerial platforms and vehicles such as vertical takeoff and land aircraft.

A second objective of the present invention is to provide a counter-revolving stabilizer with no physically mountable axle or shaft requirement.

A third objective of the present invention is to provide a gyrostabilizer having less mass than a disk of equal radius.

A fourth objective of the present invention is to provide a gyrostabilizer that requires less space than a disk.

A fifth objective of the present invention is to provide a gyrostabilizer that produces more controllable revolutions per minute than a disk.

A sixth objective of the present invention is to provide a dual counter-revolving gyrostabilizer that permits independent control of each gyro.

A seventh objective of the present invention is to offset gyroscopic precession and double the effect of angular momentum available from a single gyro.

An eighth objective of the present invention is to provide a gyrostabilizer that can be retrofitted to function in many existing vehicles and structures.

A ninth objective of the invention is to provide a shaftless gyrostabilizer of simultaneously counter-revolving masses that are sandwiched together for use with aerial platforms and vehicles.

A first embodiment of the present invention is a design wherein a race or track contains balls propelled in a circular motion via fluid pressure or electromagnetic propulsion in an arrangement where there is no center shaft or axle. This arrangement shifts the weight of the gyrostabilizer to the perimeter where most of the momentum is created. Thus, greater momentum can be generated at a fraction of the weight of gyrostabilizers that spin on an axis. Also, the space between the center of revolution and the revolving weights is usable or void space for vehicles or structures that are weight sensitive. The absence of a physical shaft or axle also provides unlimited flexibility in sizing the stabilizing device, such that the device can be scaled to fit very large or very small vehicles and structures, including toys.

Additional embodiments of the rotatable rings can include rigid contiguous ring members, such as those formed from metal, plastic, composites, and the like, that rotate with or without tracks. The rings can include flexible, bendable contiguous materials, such as chains and ropes, that rotate with or without tracks. Additionally, the rings can include liquids, such as but not limited to oils, water and the like. Furthermore, the rings can include rotating gasses.

Further objects and advantages of this invention will be apparent from the following detailed description of the presently preferred embodiments that are illustrated schematically in the accompanying drawings.

BRIEF DESCRIPTION OF THE FIGURES

FIGS. 15A, 15B, and 15C show three views of the gyrostabilizer used in a boat.

FIG. 18 is a perspective view of another embodiment of the gyrostabilizer.

DESCRIPTION OF THE PREFERRED EMBODIMENTS

Figure 1:
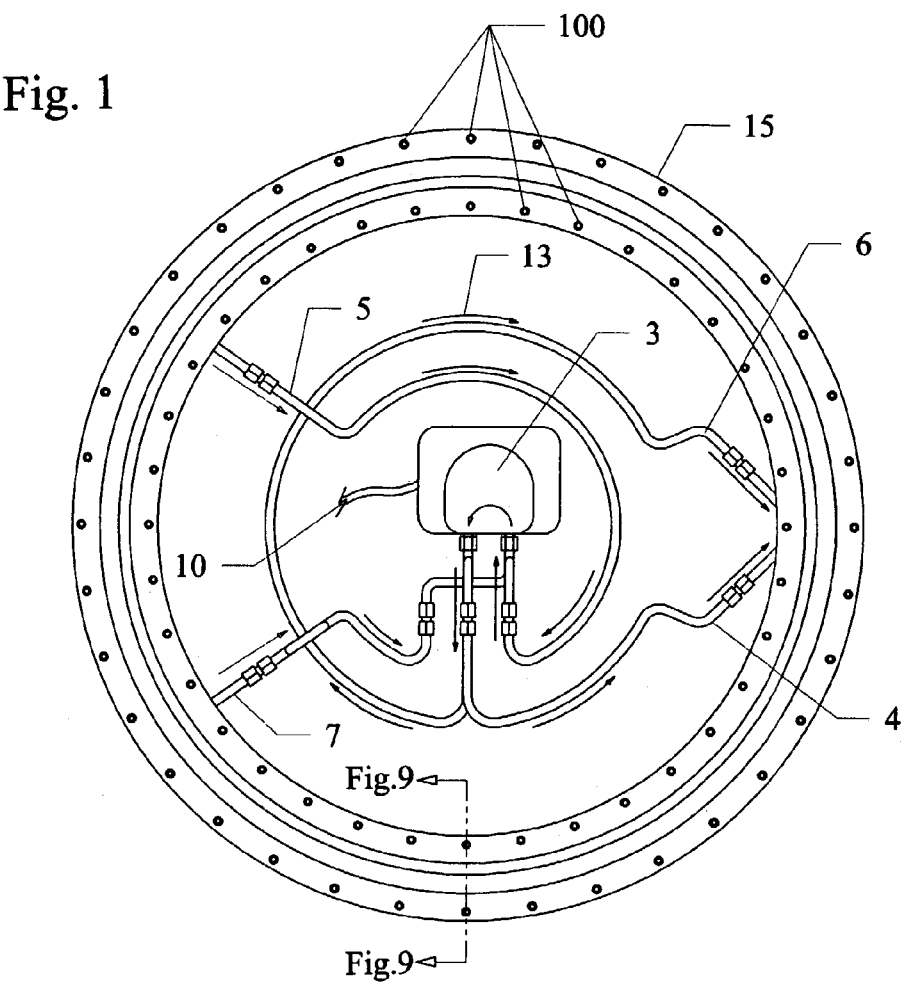
FIG. 1 is a top view of a fluid driven gyrostabilizer.

Before explaining the disclosed embodiments of the present invention in detail, it is to be understood that the invention is not limited in its application to the details of the particular arrangement shown since the invention is capable of other embodiments, including, but not limited to, machines such a camera mount on boats and helicopters. Also, the terminology used herein is for the purpose of description and not of limitation.

The term "race" is used interchangeably with track or groove to mean a circular or annular cavity in which are placed movable weights, usually spherical and made of metal or metal alloys. The term "revolving" is used herein to mean to cause to go round in an orbit which is in contrast to the term "rotate" meaning to turn about an axis or a physical shaft or axle.

In the preferred embodiment of the present invention, weights such as metal balls are rotatably inserted in a track and are separated by vanes which minimize hydraulic resistance to movement of the weights and provide a surface area against which a fluid is directed to propel the track of rotating balls in a circular motion, known herein as revolving. The vanes also hold each spacer in place and direct the balls in the direction of fluid flow. In order to create a stabilizing device, two circular tracks are used in a stacked arrangement, such that the counter-revolving effects of the balls in their respective tracks assist in stabilizing vehicles and structures moving in different directions.

The circular race or track is formed of a durable, lightweight composite material such as, carbon fiber or a lightweight metal alloy. In a preferred embodiment, the two circular tracks of the present gyrostabilizer are bolted together in a stacked arrangement with a gasket or other suitable packing material between the upper and lower track.

The rotating weights that are propelled by a fluid can be any spherical balls made of noncorrosive materials such as silicon-nitride, dense polymers or metallic alloys such as tungsten-carbide, and the like. The weights may be onepiece discs or rings having a spherical shape to reduce friction during rotation or spinning within the track. The vanes, also sometimes called "spacer vanes," separate each ball in the track and can be made from the same durable, lightweight composite material as the track. Thus, carbon fiber or a lightweight metal alloy may be used in the fabrication of the vanes.

The fluid used to propel the track of balls can be any synthetic or petroleum-based, high pressure, hydraulic fluid. Likewise, any viscous, lubricating and noise dampening, non-flammable oil, water or air, may be used as a fluid propellant. The pump that is used to propel the fluid into the track can be any suitable pressure pump and can be located in any convenient location within the vehicle or structure that is being stabilized. Such a pump is manufactured by Hi-Speco Corporation and is identified as an engine driven hydraulic pressure pump.

When the materials described above are assembled as shown in the detailed description that follows, a method of stabilizing vehicles and structures is possible. A first set of balls is rotated in a first circular track in a first direction. A second set of balls is rotated in a second circular track in a second direction that is opposite to the first direction, simultaneous to the first set of balls wherein counter-revolving effects of the first and second set of balls assist in dampening pitch and roll when the gyro is revolving perpendicularly to the pull of gravity and parallel to the direction of unsteady movement. In addition, the counter-revolving gyrostabilizer of this invention can be used to dampen yaw if it is positioned at right angles to the pull of gravity. In zero gravity, the gyrostabilizer maintains an object in a stationary position.

A second embodiment of the present invention consists of a first circular track having a first set of balls that are alternatingly made of ferrous and non-ferrous material. The first circular track is adjacently stacked on a second circular track having a second set of balls that are also alternatingly made of ferrous and non-ferrous material. In combination with the first and second circular tracks is a means for moving the first and second track in opposite, counter-revolving directions by electromagnetic propulsion. Electrified magnets are positioned in an efficient and symmetrical pattern on both the first and second circular tracks. When power is applied, the magnets attract the ferrous balls in the desired direction and with a controllable speed to accomplish stabilization of a vehicle or structure which may be subject to vibrations, pitching, yawing, rolling, swaying and the like.

The ferrous balls of the second embodiment are by definition largely comprised of iron or an iron alloy. Steel is a suitable material because of its strength and durability. The non-ferrous balls can be formed of ceramic material or a non-ferrous alloy such as silicon nitride. The non-ferrous balls are preferably of the same density as the ferrous balls.

The diameter of the gyrostabilizer of the present invention can range from a few inches for a flying toy, to over ten (10) feet in diameter for larger structures. The rate of revolution can be in the range from less than approximately 100 to approximately 20,000 revolutions per minute (rpm). In the preferred embodiment wherein a fluid pressure pump is used to propel the gyrostabilizer, an oil pressure pump manufactured by Hi-Speco Corporation can produce pressure in a range from approximately 1500 to approximately 3000 pounds per square inch (psi). Specifications for the pump are dependent on the size of the gyro.

In case of an emergency, the gyrostabilizer can be shut down by reversing the direction of fluid flow or by reversing the direction of electromagnetic propulsion. Also, when mounting the gyrostabilizer in a vehicle or structure, rubber bushings are used to attach the stabilizer in a manner similar to the mounting of an engine in an automobile. The stabilizer is positioned symmetrically and centrally to the center of gravity of the area in which stability is desired.

Referring to the drawings in more detail:

The reference numeral 1 when shown in each figure designates a first circular track having a first set of balls. Reference numeral 2 when shown in each figure designates a second circular track having a second set of balls. In addition, the track structures 1 and 2 include a top race 15 and a bottom race 16 which is joined to form an annular groove filled with circumferentially movable weights 8. According to the present invention, at least a pair of the track structures 1 and 2 are installed in vehicles, machines and structures either perpendicular to or parallel to direction of the force that causes unsteady movement. Ideally, a gyrostabilizer is centered and placed symmetrically in the area of unsteady movement.

In FIG. 1 a top view of the gyrostabilizer shows a first track 1 positioned directly above a counter-revolving track (not shown). The fastening means 100 are shown around the inside and outside perimeter of the top race 15 and when attached to the bottom race (not shown) it forms a cavity that contains the rotating and revolving weights of the stabilizer. An oil pressure pump 3 is positioned inside the circular track 1 and forces oil simultaneously into the upper gyro drive line 4 and a lower gyro drive line 6. The oil flow direction 13 is indicated by arrows along each pipeline. The oil pressure which can range between 1,500 and 3,000 psi, causes the balls inside the upper track to rotate and turn in a first direction before the oil enters an upper gyro return line 5 while the balls inside the lower track rotate and turn in a second direction before the oil enters return line 7. In this manner the oil is re-circulated to the pump to provide continuous propulsion of balls in the two tracks in a counter-revolving direction. A power source 10 is connected to the pump 3.

Figure 2:
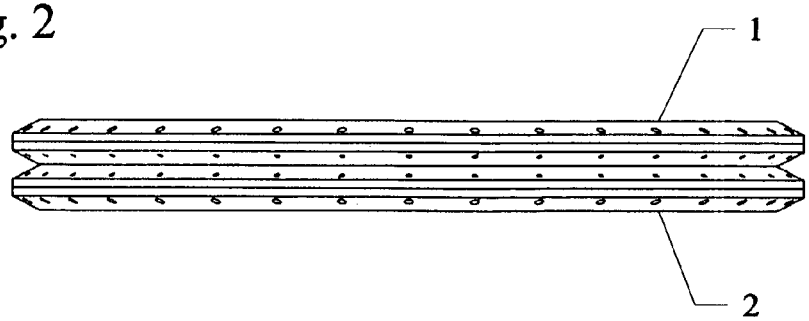
FIG. 2 is a side view of the races or tracks of the gyrostabilizer.
Figure 3:
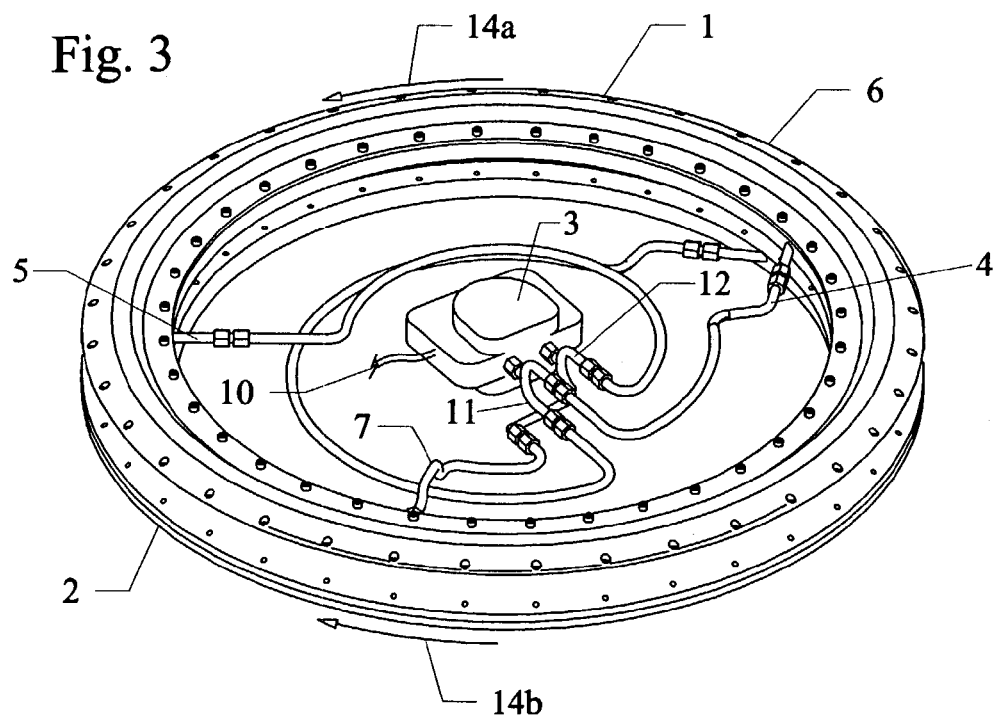
FIG. 3 is a perspective view of the gyrostabilizer having the fluid pump centrally located.

In FIG. 2 a side view of the upper gyro assembly 1 is shown in a stacked arrangement with the lower gyro assembly 2. FIG. 3 is a perspective view of the gyrostabilizer showing the first track 1 and the second track 2 with the fluid pressure pump 3 centrally located among the gyro drive lines 4 and 6 and the return lines 5 and 7. More detail is shown with the "Y" connector 11 which connects the upper and lower drive lines and the "Y" connector 12 which connects the upper and lower return lines to support simultaneous revolutions and recycling of fluid. The power connection 10 for the pump is shown. The counter revolving direction of the balls is indicated as 14a and 14b.

Figure 4:
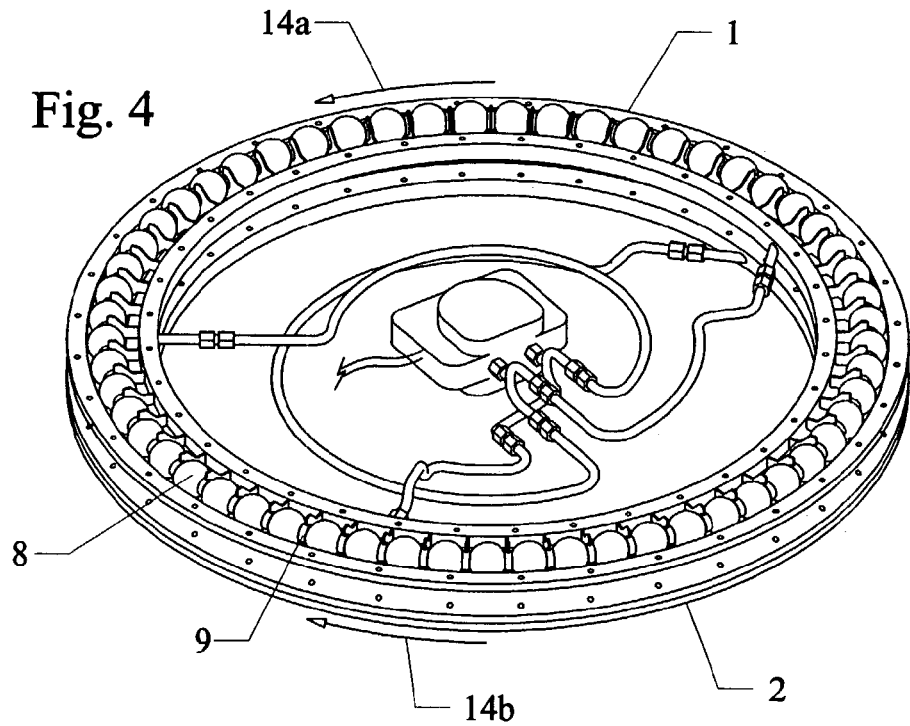
FIG. 4 is a view of the gyrostabilizer with the top cover of the race removed.

FIG. 4 provides a view of the gyrostabilizer with the top cover of the first track 1 removed. Each steel ball 8 is separated by a spacer vane 9 in a manner that efficiently and completely fills the track thereby placing the maximum weight on the perimeter of the gyrostabilizer. Counter revolving movement of balls in the first track 1 and second track 2 is shown by arrows 14a and 14b.

Figure 5:
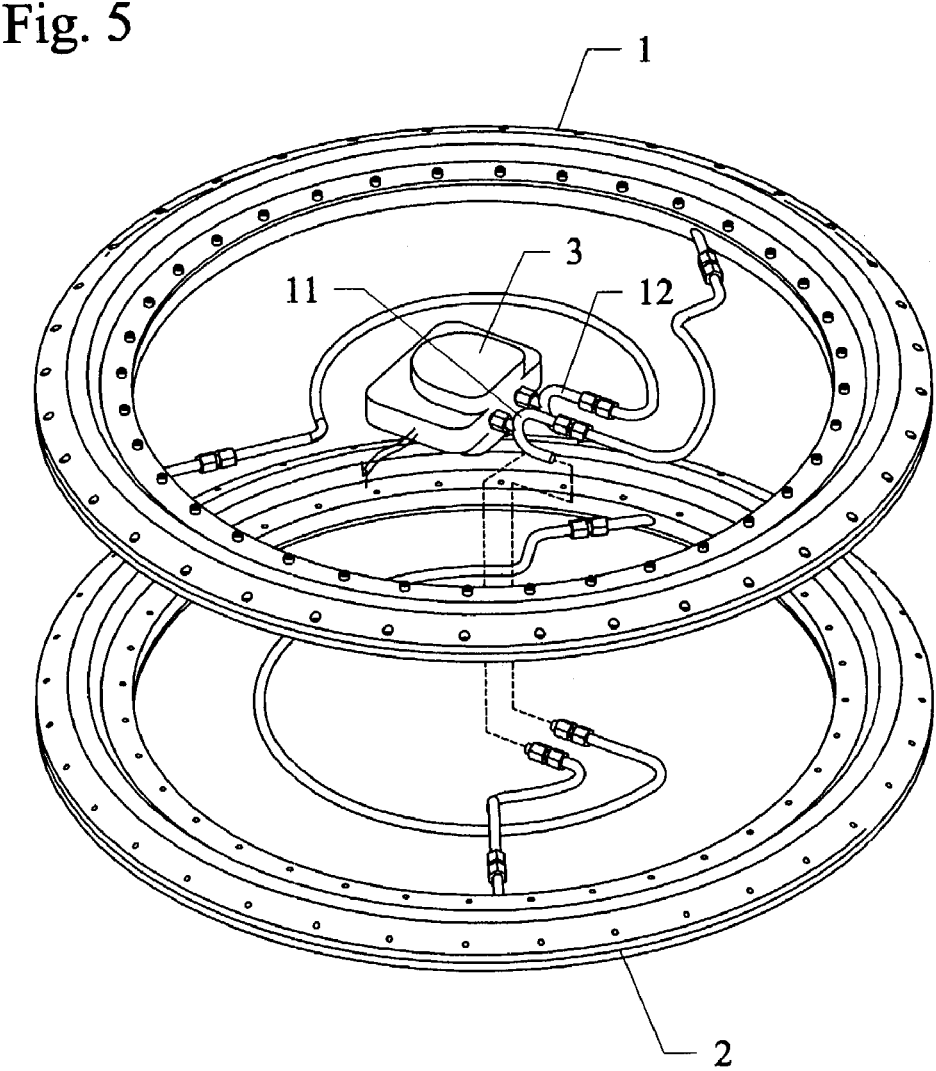
FIG. 5 is an exploded view of the gyrostabilizer with upper and lower tracks separated.
Figure 6:
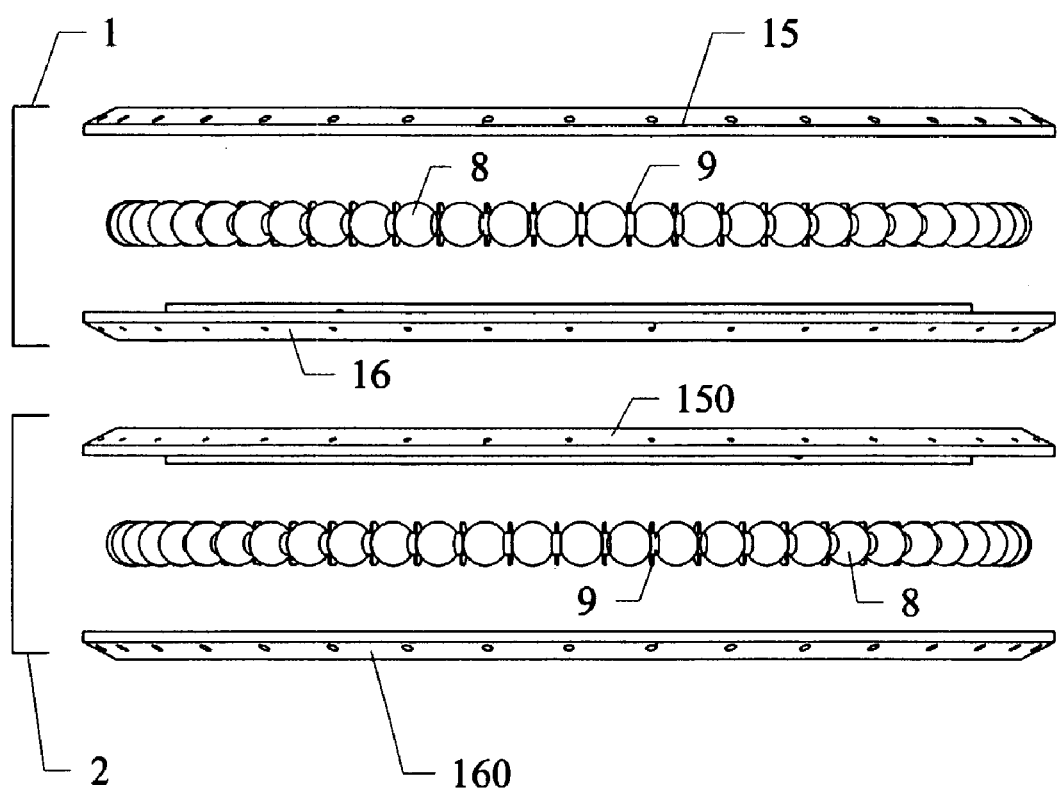
FIG. 6 is an exploded side view of the gyrostabilizer showing steel balls, spacer vanes, upper and lower track assemblies.

FIGS. 5 and 6 are exploded views of the gyrostabilizer assembly. In FIG. 5 the first track 1 and the second track 2 are separated to show how the "Y" connector for the drive lines 11 and the "Y" connector for the return lines 12 are connected to the pump 3. FIG. 6 is a side view of the first track 1 with top cover 15 and bottom cover 16 with a concentric ring of balls 8 separated by spacer vanes 9. The same arrangement is shown for the second track 2 having a top cover 150 separated from the bottom cover 160 that contains a concentric ring of balls 8 separated by spacer vanes 9.

Figure 7:
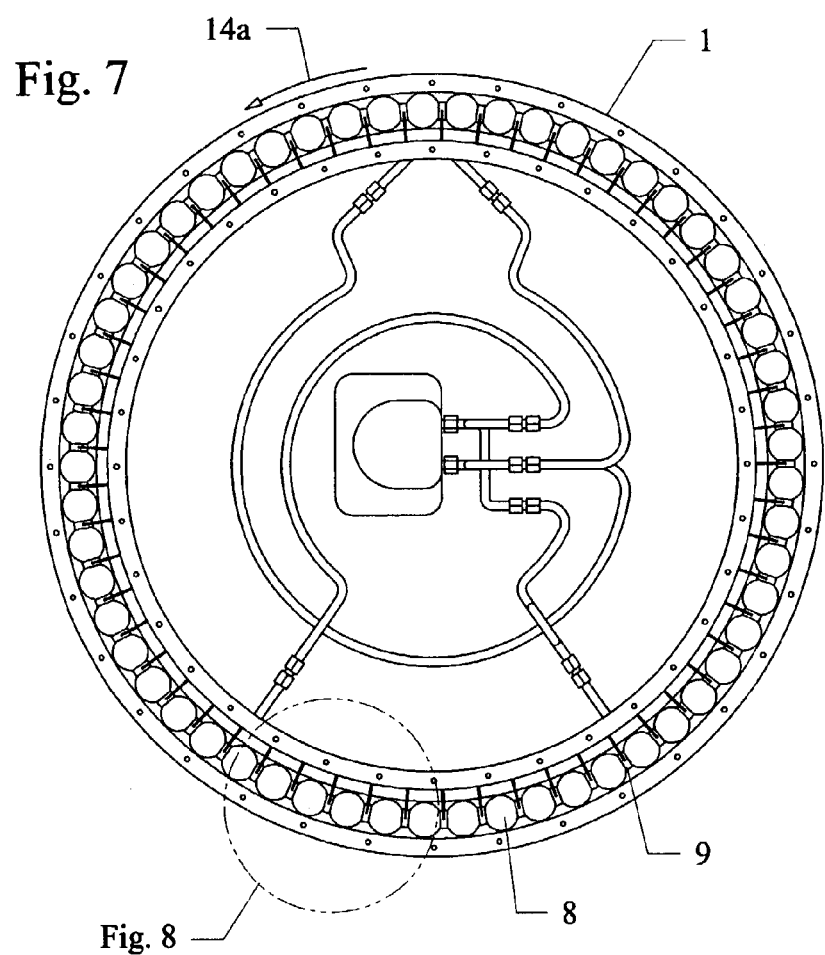
FIG. 7 is a top view of the gyrostabilizer with the top cover of the race removed.

FIG. 7 is a top view of the gyrostabilizer with the top cover of the first track 1 removed. This view provides greater detail on the arrangement of each ball 8 and the spacer vanes 9. The spacer vanes are constructed of a lightweight metal alloy and provide a confined space for each ball to rotate freely thus adding to the momentum of revolution in the direction shown by arrow 14a.

Figure 8:
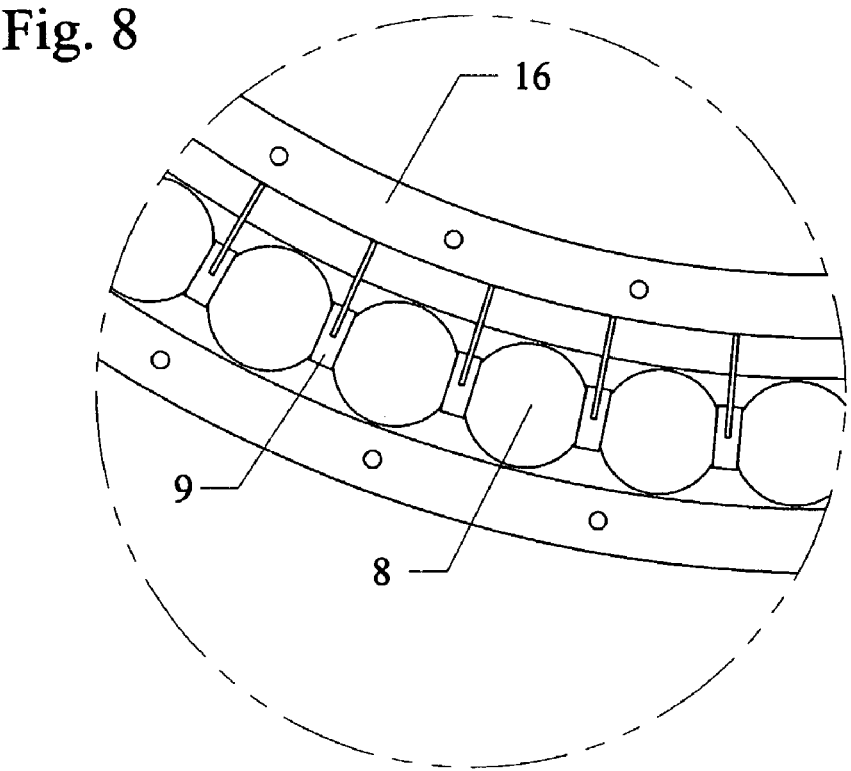
FIG. 8 is an enlarged view of balls and vanes in the lower race.
Figure 9:
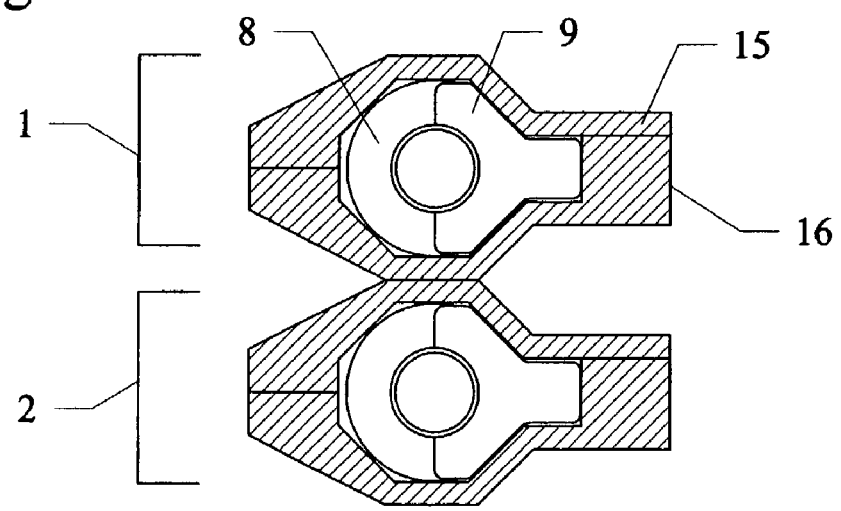
FIG. 9 is an enlarged cross-section of the upper and lower gyro assembly.

FIGS. 8 and 9 are enlarged drawings of sections of FIGS. 7 and 1, respectively. FIG. 8 is a top view of balls 8 and spacer vanes 9 in the bottom cover 16 of the upper track as shown in FIG. 7. In FIG. 9 a cross sectional view of the first track 1 in a stacked arrangement above the second track 2 shows how the top cover 15 fits over the bottom cover 16 forming a leak-free, octagonal shaped track that permits free movement of the ball 8 and the secure positioning of the spacer vane 9 within the cavity formed by the top and bottom covers.

Figure 10:
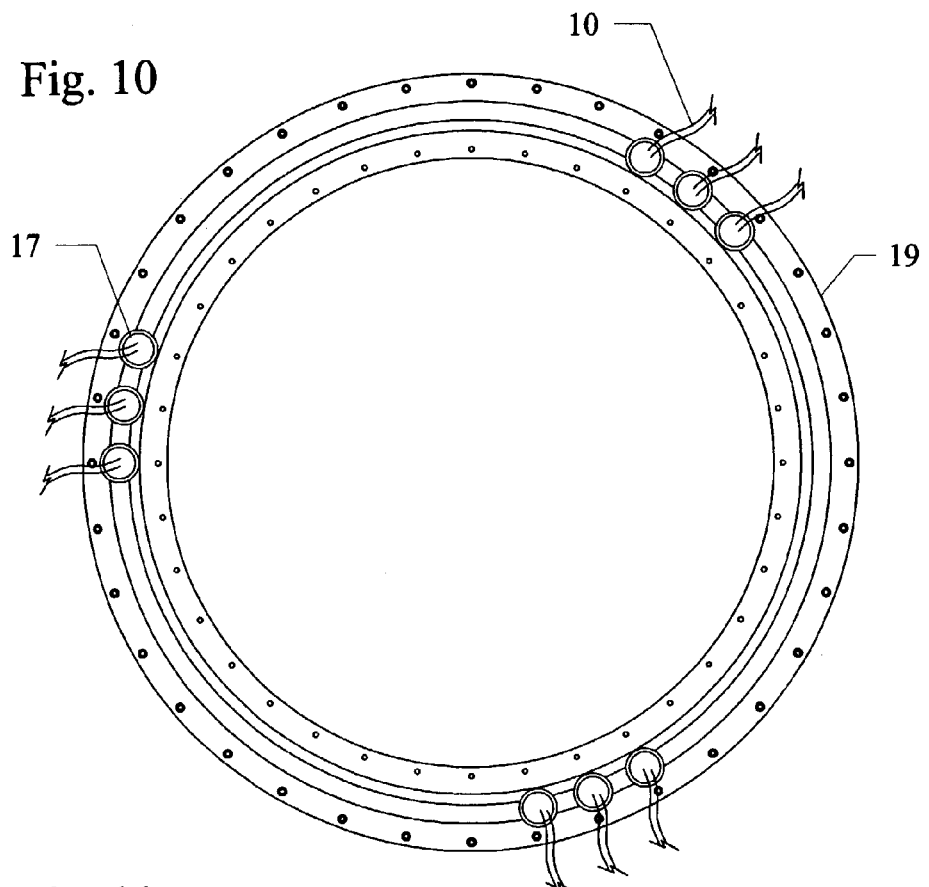
FIG. 10 is a top view of the electromagnet driven gyro.
Figure 11:
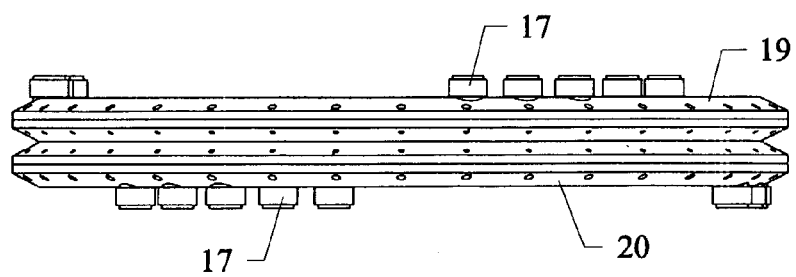
FIG. 11 is a side view of the electromagnet driven gyro showing a series of magnets equally distributed along the upper and lower gyro assembly.

FIG. 10 is a top view of the first track 19 of an electromagnet driven gyro. A series of three electromagnets 17 are positioned strategically above the cavity filled with ferrous and non-ferrous balls (not shown). The electric power source 10 for each magnet is shown. It should be noted that the center of the gyrostabilizer is usable space or can be left void. FIG. 11 is a side view of the assembly propelled by electromagnets. Here a series of five magnets 17 are equally distributed along the first track 19 and the second track 20 of the electromagnet driven gyro.

Figure 12:
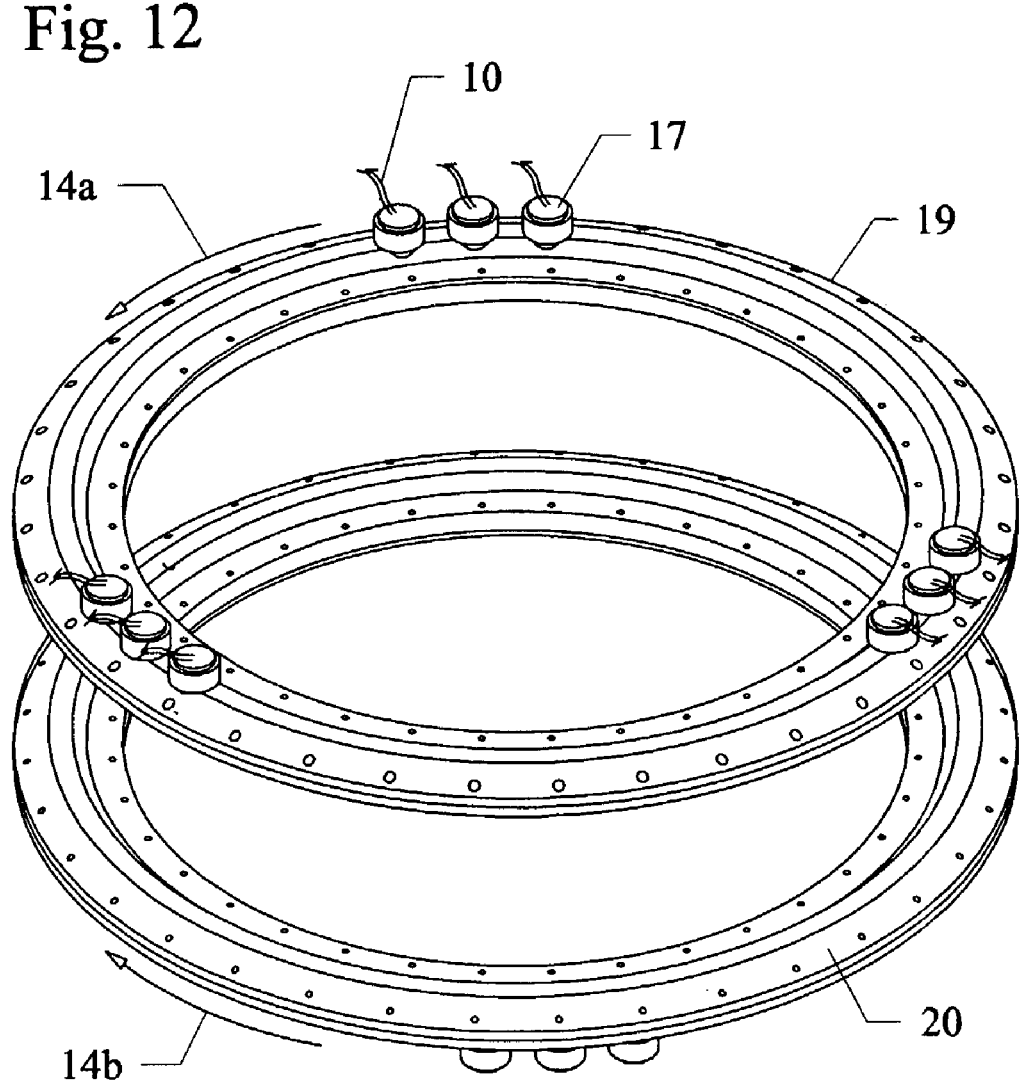
FIG. 12 is an exploded view of the upper and lower tracks of the electromagnet driven assembly.
Figure 13:
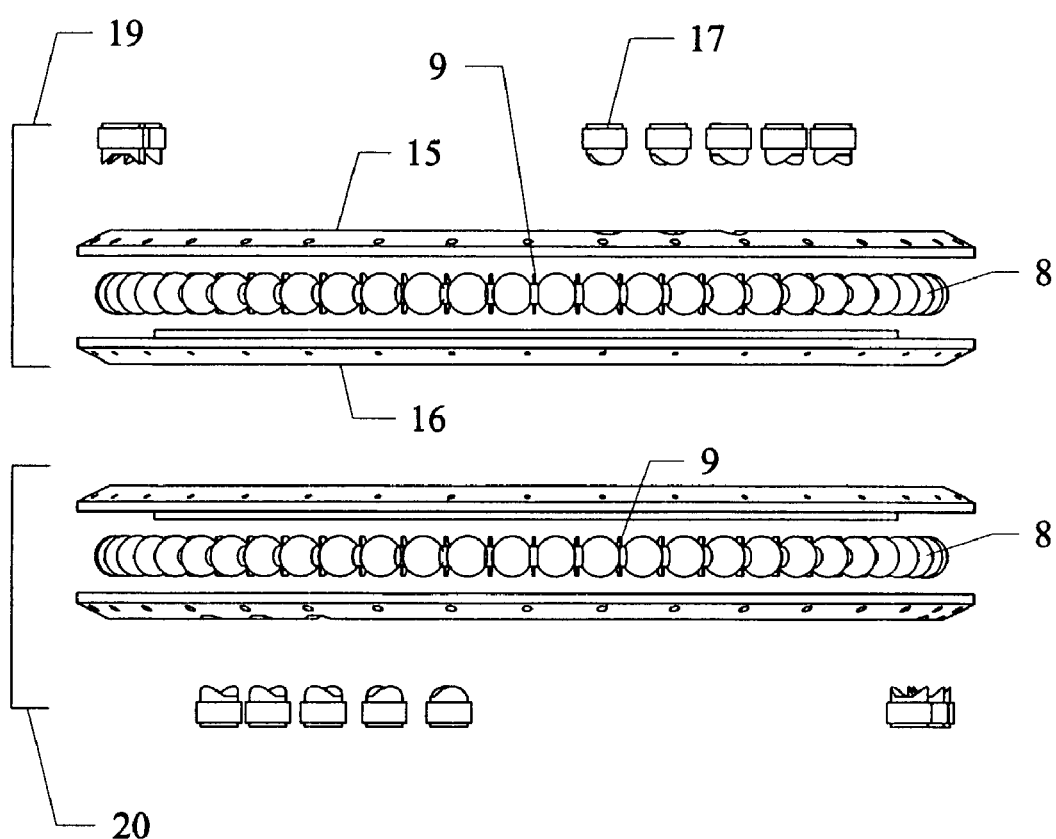
FIG. 13 is an exploded side view of the electromagnet driven gyrostabilizer showing ferrous and nonferrous balls, spacer vanes, upper and lower track assemblies.

FIGS. 12 and 13 are exploded views of electromagnet driven gyrostabilizers. FIG. 12 shows the first track 19 separated from the second track 20 with a strategically positioned series of three electromagnets 17 having power source connections 10. The direction of revolution of balls in each track is as indicated by arrows 14a and 14b. FIG. 13 shows a first track 19 separated from a second track 20 with the top cover 15 apart from the bottom cover 16 showing the concentric ring of balls 8 separated by vanes 9. The balls 8 are propelled in a counter revolving direction by a series of five magnets 17 positioned at equidistant points around the track. It is understood that the first track 19 and the second track 20 have the same arrangement of balls and magnets except that the balls in the first track 19 simultaneously revolve in the opposite direction from the balls in the second track 20. The vanes 9 hold the spacers in place and in the assembled gyro are called, "spacer vanes."

Figure 14A:
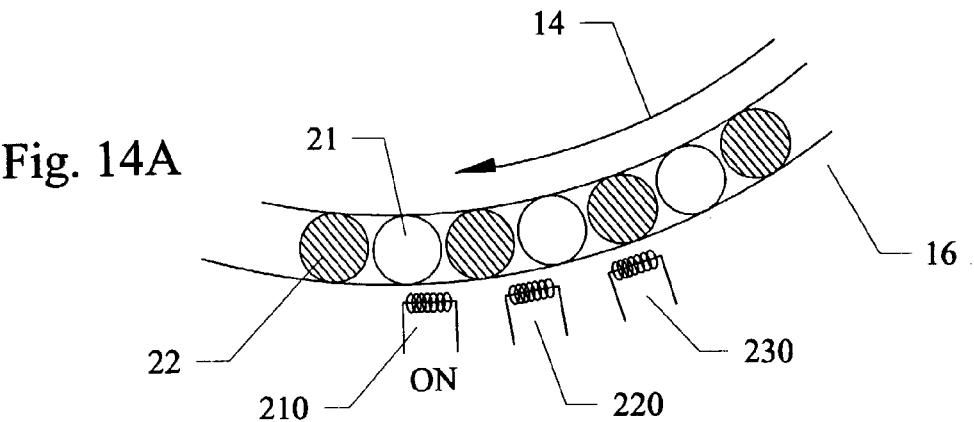
FIGS. 14A, 14B, and 14C show three views of ferrous and nonferrous ball progression propelled by electromagnets (spacer vanes are omitted).
Figure 14B:
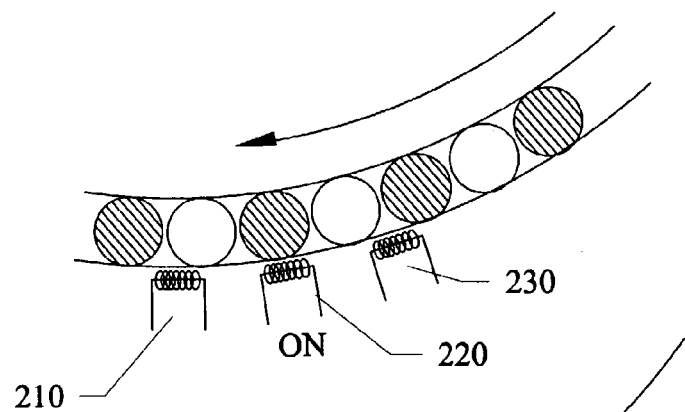
Figure 14C:
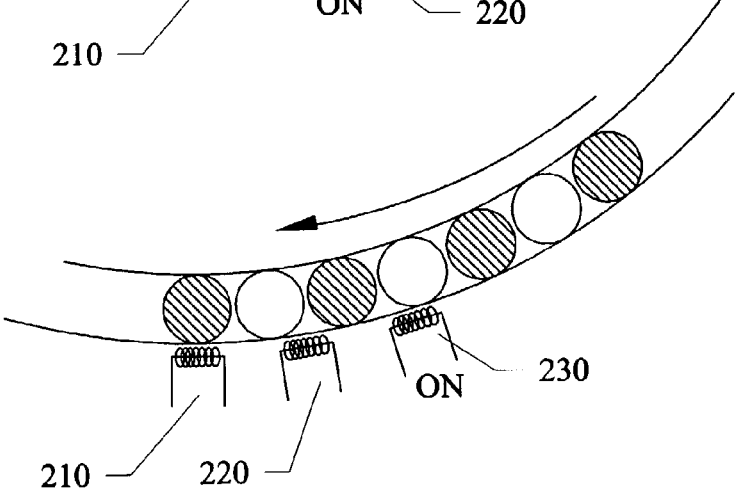

FIG. 14 has three views of nonferrous balls 21 and ferrous balls 22 being propelled by a series of three electromagnets 210, 220, 230 along the bottom cover 16 in the direction 14. For clarity, spacer vanes are not shown in FIG. 14. The non-ferrous balls are of the same density as the ferrous balls. The sequence for switching the magnets on and off is preferably first, middle and last. Thus, FIG. 14A shows movement within the race when the first magnet 210 is turned on to pull a ferrous ball in the desired direction. FIG. 14B shows middle magnet 220 switched on to propel another ferrous ball in the desired direction. Finally, FIG. 14C shows movement that occurs when the last magnet in the series 230 is switched on to support and sustain the movement of all ferrous balls in the desired direction. The ferrous balls 22 cause the nonferrous balls 21 to revolve in the same direction as the ferrous balls propelled by the electromagnets. Also the arrangement of magnets propels the balls in the desired direction.

Figure 16B:
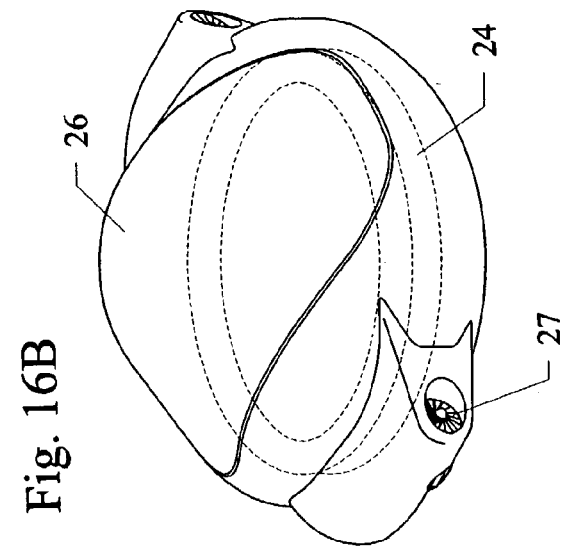
FIG. 16 shows three view of the gyrostabilizer used in a hovercraft.
Figure 16A:
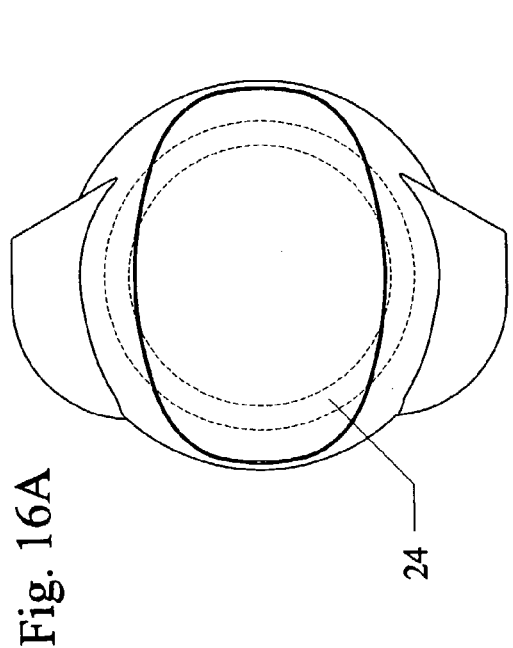
Figure 16C:
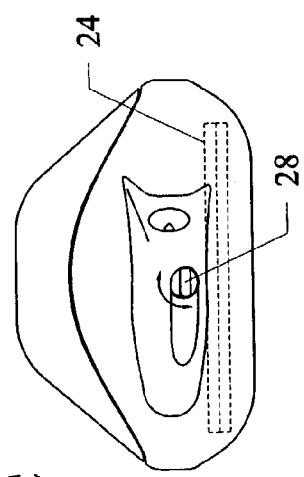
Figures 17A, 17B, 17C:
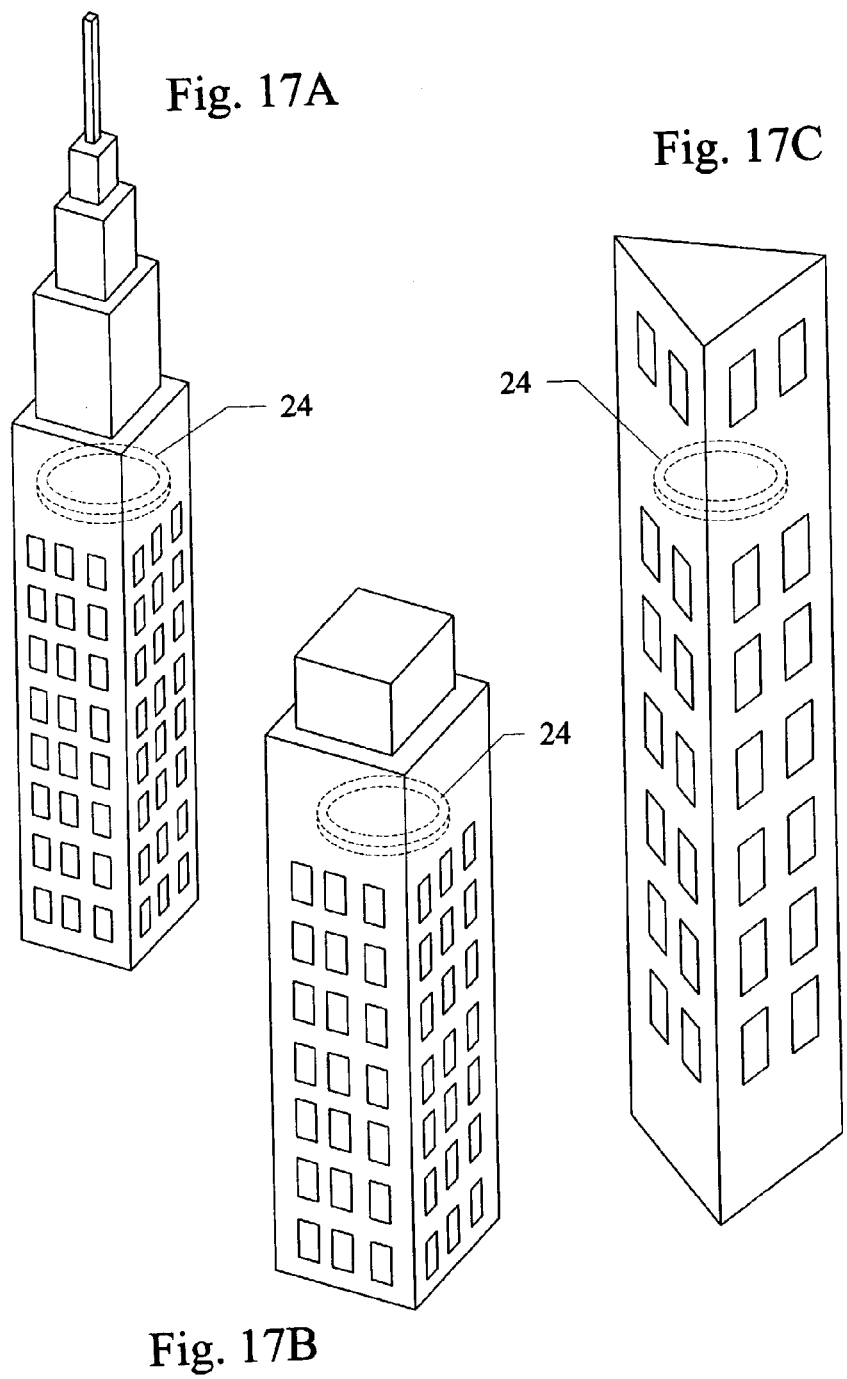
FIGS. 17A, 17B, and 17C show three views of the gyrostabilizer used in a skyscraper.

FIGS. 15 through 17 contain illustrations as to how the gyrostabilizer can be used in a variety of vehicles and structures. On a smaller scale each vehicle shown could be designed as a toy. FIGS. 15A, 15B and 15C show a boat 25 with a dual counter revolving gyrostabilizer 24 positioned to revolve horizontally to prevent the boat from pitching upward on take off. FIGS. 16A, 16B and 16C show a hovercraft 26, sometimes called a Vertical Takeoff & Land Craft (VTOL) with turbine intake 27 and a rotating thruster 28 wherein the dotted line configuration in each figure is a gyrostabilizer 24. FIGS. 17A, 17B, and 17C show placement of a gyrostabilizer 24 in a skyscraper to dampen the sway experienced in the higher portion of the structure. The gyrostabilizer is centered horizontally about the central axis of the building in the area subject to the swaying phenomenon.

FIG. 18 is a perspective view of another embodiment of the gyrostabilizer 300. This embodiment can include two rigid ring masses 310, 320 that can be formed rigid contiguous materials, such as but not limited to stainless steel, aluminum, plastics, composites, and the like. The ring masses 310, 320 can be arranged to overlay one another and in a sandwich configuration to one another. The ring masses 310, 320 can be kept parallel and sandwiched to one another by one or more similar rotating stations 330, 340, 350, and 360. Station 330 can include an outer rectangular housing 331 that wraps about the ring masses 310, 320, with upper freely moveable roller 332 above upper ring mass 310, with another identical freely moveable roller (not visible) underneath the lower ring mass 320. Two rotatable wheels 334, 336 can be rotated in opposite directions from one another by a motor 339, so that both ring masses 310, 320 simultaneously counter revolve relative to another.

The contiguous rigid ring masses can be rotated relative to one another without the use of tracks. Alternatively, the rigid ring masses can be rotated relative to one another in tracks such as those described in the previous embodiments.

In additional embodiments, the ring masses 310, 320 can be flexible contiguous materials, such as chains formed from metal, plastic, composites, and the like. Still furthermore, the flexible contiguous materials can be formed from other types of materials such as but not limited to rope, and the like. The flexible contiguous materials can also be use with or without tracks such as those embodiments previously described.

The embodiment of FIGS. 1–7 can be modified to be used without any ball type masses or any other solid type masses, so that the pressure pump 3 is positioned inside the circular track 1 and only forces different types of fluid simultaneously into the upper gyro drive line 4 and a lower gyro drive line 6. The fluid embodiments can include liquids, gases, combinations thereof, that can operate similar to the first embodiment.

In a liquid application, the pressure pump can move liquids solely through the two tracks, such as only oil. Alternatively, the pressure pump can move other types of liquids such as water, and the like. The liquid density and mass can be selectively adjusted to achieve various stability effects in this embodiment by using different types and/or mixtures of liquid.

In a gas state application, the pressure pump can move gasses solely through the two tracks, such as only oxygen, argon, helium, and the like, and combinations thereof. The density and mass of the gases can be selectively adjusted to achieve various stability effects in this embodiment by using different types and/or mixtures of gases.

Still furthermore, the pressure pump can combine and move combinations of liquids and gasses. Additionally, the other types of masses, such as particles of various sizes such as up to approximately 1000 microns or more, can be mixed with either or both the liquids and/or gasses as the moveable masses in the simultaneously counter-revolving sandwiched gyroscope.

Still furthermore, the second electromagnetic embodiment can be used with fluid applications where for example the fluid contains conductive materials such as but not limited to metal particles, and the like.

While the invention has been described, disclosed, illustrated and shown in various terms of certain embodiments or modifications which it has presumed in practice, the scope of the invention is not intended to be, nor should it be deemed to be, limited thereby. Other modifications or embodiments, such as gyrostabilizers in machines, as may be suggested by the teachings herein are particularly reserved especially as they fall within the breadth and scope of the claims here appended.

I claim:

1. A method of forming a gyrostabilizer for stabilizing a moveable platform, comprising the steps of:
   (a) providing a first moveable mass;
   (b) providing a second moveable mass;
   (c) sandwiching together the first moveable mass to the second moveable mass so that the first moveable mass and the second moveable mass overlap one another and are each located in planes parallel to one another;
   (d) revolving the first moveable mass in a first direction;
   (e) simultaneously counter-revolving the second moveable mass in a second direction that is opposite to the first direction, wherein counter revolving effects of the first and the second set of moveable masses assists stabilization of the platform moving in different directions; and
   (f) mounting the revolving first moveable mass and the counter-revolving second moveable mass in an object without using a shaft or axle through a mid portion of the first and the second moveable masses, wherein gyroscopic effects of the revolving and the counter-revolving masses assists in stabilization of the moving object.

2. The method of claim 1, further comprising the step of: providing an aerial platform as the moveable platform.

3. The method of claim 1, further comprising the steps of:
providing a first rigid ring mass as the first moveable mass; and
providing a second rigid ring mass as the second moveable mass.

4. The method of claim 3, further comprising the step of:
rotating the first moveable ring and the second moveable ring in at least one track.

5. The method of claim 1, further comprising the steps of:
providing a first gas as the first moveable mass; and
providing a second gas as the second moveable mass.

6. The method of claim 5, further comprising the step of:
rotating the first gas and the second gas in at least one track.

7. The method of claim 1, further comprising the steps of:
providing a first liquid as the first moveable mass; and
providing a second liquid as the second moveable mass.

8. The method of claim 7, further comprising the step of:
rotating the first liquid and the second liquid in at least one track.

9. The method of claim 7, further comprising the step of:
selecting from one of water and oil, as the first and the second fluids.

10. The method of claim 1, further comprising the steps of:
providing a first flexible contiguous linear material as the first mass; and
providing a second flexible contiguous linear material as the second mass.

11. The method of claim 10, further comprising the step of:
providing a chain as the first and the second flexible contiguous linear materials.

12. The method of claim 11, further comprising the step of:
rotating the first and the second chains on a track.

13. The method of claim 10, further comprising the step of:
providing a rope as the first and the second flexible contiguous linear materials.

14. A shaftless gyrostabilizer for stabilizing moving objects comprising:
 a) a first moveable mass;
 b) a second moveable mass;
 c) means for orientating the first moveable mass and the second moveable mass in a sandwiched configuration to each other so that the first and the second moveable masses overlap one another, and are each located in planes parallel to one another;
 d) first means for rotating the first mass in a first direction;
 e) second means for simultaneously counter-rotating the second mass in a second direction opposite to the first direction; and
 f) means for mounting the first and the second rotating masses in an object without using a shaft or axle through a mid portion of the first and the second rotating masses, wherein gyroscopic effects of the counter rotating masses assists in stabilization of the moving object.

15. The gyrostabizer of claim 14, wherein the object is an aerial platform.

16. The gyrostabilizer of claim 14, wherein the first and the second masses each include rigid contiguous rings.

17. The gyrostabilizer of claim 14, wherein the first and the second masses each include liquids.

18. The gyrostabilizer of claim 14, wherein the first and the second masses each include gasses.

19. A shaftless gyrostabilizer for moving objects comprising:
 a structure for mounting a first moveable mass and a second moveable mass in a moving object without using a shaft or axle through a mid-portion of the first and the second masses, wherein the first mass and the second mass are sandwiched together to overlap each other in a parallel plane; and
 a source for rotating the first mass and the second mass simultaneously in opposite directions to each other to effect stabilization of the moving object.

20. The shaftless gyrostabilizer of claim 19, wherein the moving object includes a moving vehicle.

* * * * *